Dec. 21, 1926.
A. L. McWHIRTER
PLANT PROTECTOR
Filed May 18, 1923
1,611,759
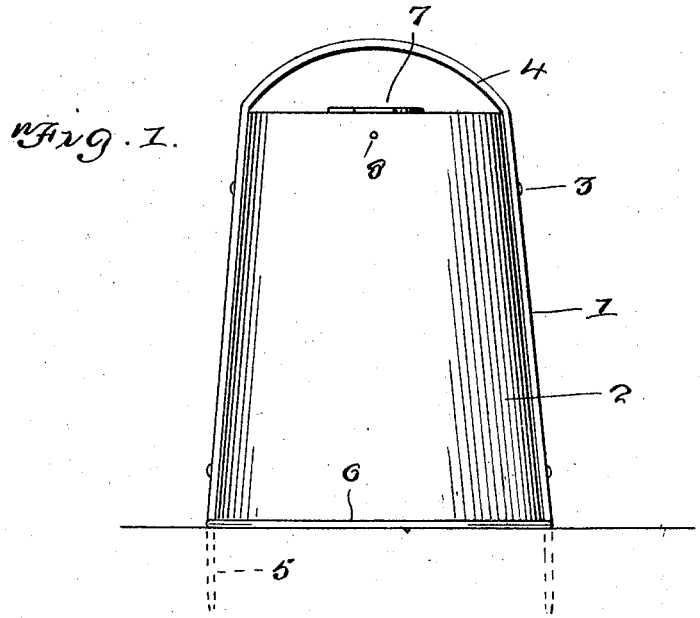
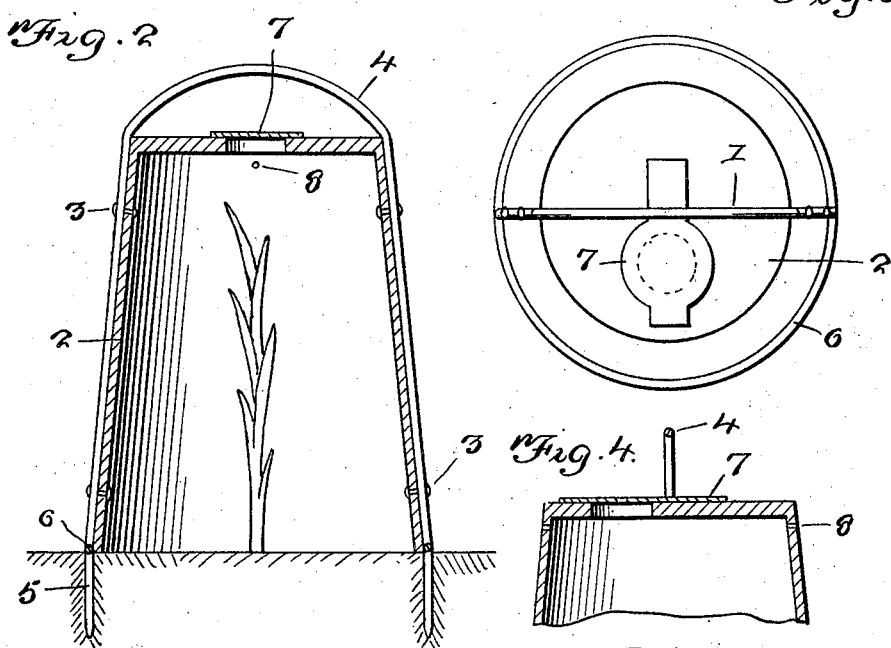
A. L. McWhirter
INVENTOR
BY Victor J. Evans
ATTORNEY Patented Dec. 21, 1926.

1,611,759

UNITED STATES PATENT OFFICE.

ANDREW LEVIN McWHIRTER, OF HOLDEN, ALBERTA, CANADA.

PLANT PROTECTOR.

Application filed May 18, 1923. Serial No. 639,839.

This invention relates to a plant protector, the general object of the invention being to provide a cover for a plant so as to protect the same from frost or the sun when the plant has just been planted.

Another object of the invention is to so form the devices that they can be taken apart and placed together so that they will occupy but little room when stored or crated for shipment.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the device in use.

Figure 2 is an enlarged sectional view of the device itself.

Figure 3 is a top plan view and Figure 4 is a detail section taken at right angles to the showing in Figure 2.

As shown in these views the device consists of a wire 1 bent into U-shape and a cup-shaped member 2 which is fastened to the limbs of the wire by bolts or the like, as shown at 3. This member has its upper end closed and its lower end open so that it can be placed over a plant and I prefer to make the member of tapered shape with its lower end of the greater diameter. The bight of the wire is arranged above the top of the member 2 so as to form a handle 4 and the ends of the wire extend below the bottom of the member so as to form legs 5 which are adapted to enter the ground to hold the device in position. The member 2 may be formed of glass, weather proof paper or the like and it will be seen that when the device is placed over a plant it will protect the same from frost, the sun and strong winds. The device can also be placed over seeds for permitting the seeds to be placed in the ground earlier than usual, the device acting as a miniature hot-bed.

In some cases a ring 6 of wire or the like may support the bottom of the member 2, said ring being secured to the member 1.

It is thought from the foregoing description that the advantages and novel features of my invention will be readily apparent.

I desire it to be understood that I may make changes in the construction and in the combination and arrangement of the several parts, provided that such changes fall within the scope of the appended claim.

I provide a flap covered opening in the top of the device, as shown at 7, so that the plant can be watered without removing the device. The device is also provided with a pair of oppositely arranged holes 8 for permitting the circulation of air through the device.

What I claim is:—

A plant protector comprising a U-shaped supporting element having its leg portions arranged in divergent relation and with their extremities extending parallel and pointed so that they can be forced into the ground, an inverted tapering cup-shaped member arranged between the limbs of the U-shaped member having means for connecting the limbs to the cup shaped member upon opposite sides thereof, a ring connected with the limbs at the junction of the straight terminals with the rest of the limbs and a flap covered opening at the top of the cup shaped member, the top of the inverted cup shaped member being positioned below the arcuate portion of the U-shaped member so that the bight portion will form a handle.

In testimony whereof I affix my signature.

ANDREW LEVIN McWHIRTER.